March 18, 1969  J. S. FORD  3,432,954
LICENSE PLATE HOLDER
Filed Feb. 13, 1967
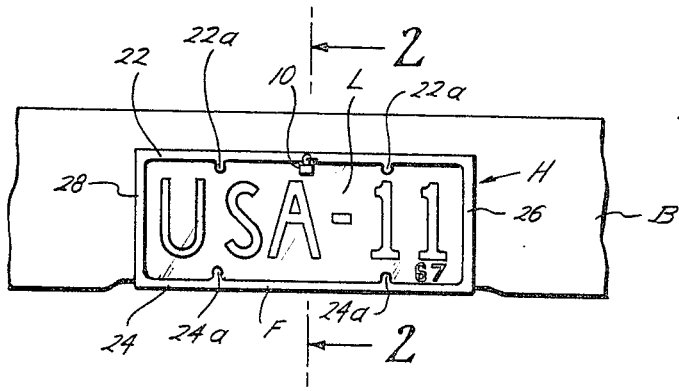
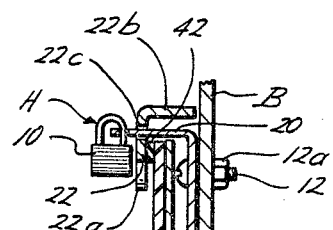
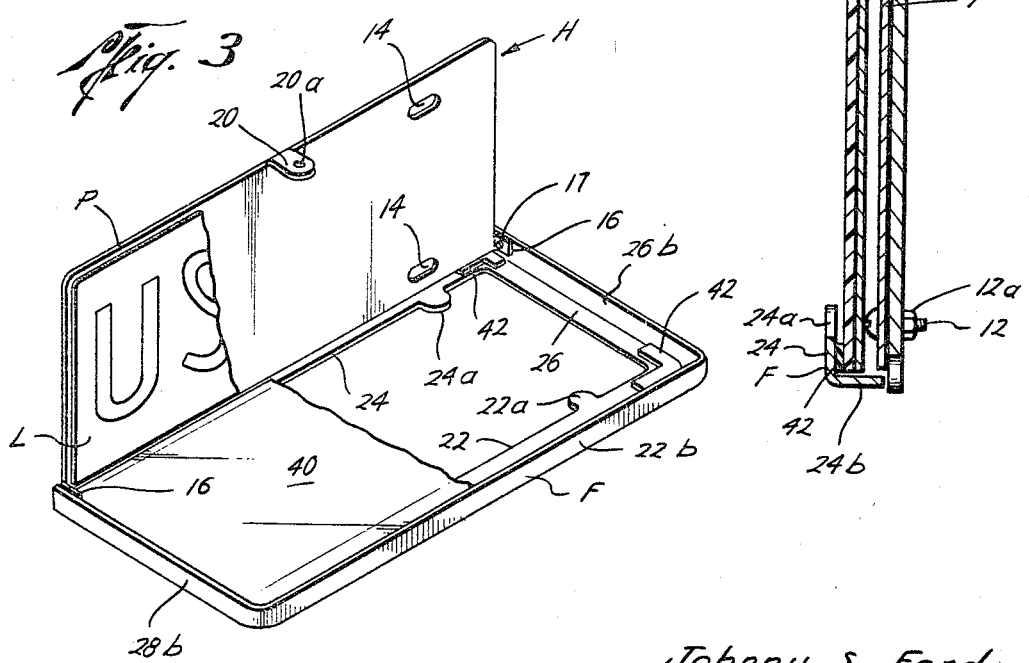
Johnny S. Ford
INVENTOR
BY Hayden & Pravel
ATTORNEYS

United States Patent Office 3,432,954
Patented Mar. 18, 1969

3,432,954
LICENSE PLATE HOLDER
Johnny S. Ford, 6801 Fairway St., Houston, Tex. 77017
Filed Feb. 13, 1967, Ser. No. 615,730
U.S. Cl. 40—202
Int. Cl. G09f 7/00, 3/18
3 Claims

ABSTRACT OF THE DISCLOSURE

A holder for a license plate or similar object and having an inside plate for securing to an automobile bumper or other location, and an outside frame which is rectangular and is hinged to the inside plate by concealed corner hinges. A license plate or similar object is completely and securely enclosed between the inside plate and a transparent sheet disposed in the outside frame by means of a front locking tab extending from the inside plate through a slot in the outside frame for receiving a conventional padlock.

BACKGROUND OF THE INVENTION

The field of this invention is holders which are adapted to be mounted on a vehicle bumper or other location for holding a license plate or other similar object. Through the years, various patents have been granted on license plate holders, examples of which are United States Patents Nos. 1,886,352, 2,134,594, 2,156,806, 2,710,475 and 2,791,046. Such prior constructions have had exposed hinges which have thus been easily severed or broken for opening the holders. Patent No. 2,134,594 is the only one of such patents which discloses a license plate holder which is capable of receiving license plates whether they have rounded or substantially square corners, but such patent does not teach the art how to provide concealed hinges with such a construction. Furthermore, although Patent No. 2,134,594 discloses the use of a conventional padlock for locking a license plate holder, it discloses such structure for mounting on a bracket with the lock to the inside of the holder. Patent No. 2,710,475 discloses a front-operating lock, but it fails to disclose a structure for locking the inside plate to the outside frame with a conventional lock even though one type of inside-type padlock construction was known since 1938 in Patent No. 2,134,594.

SUMMARY OF THE INVENTION

The license plate holder of this invention is constructed so that it is capable of receiving license plates having either rounded or square corners while at the same time having concealed hinges which connect the inside plate and front frame pivotally together without interfering with the enclosure of the license plate. The license is securely locked in the holder by a front locking tab which extends from the inside plate through a slot in the frame to receive a conventional padlock so that the holder may be mounted with the inside plate flush against the vehicle bumped.

Additional objects of the invention will be evident from the following description.

BRIEF DESCRIPTION OF THE DRAWING

FIG. 1 is an elevation illustrating the license plate holder of this invention in use on a vehicle or the like;

FIG. 2 is a vertical sectional view taken on line 2—2 of FIG. 1 and illustrates details of the preferred form of the invention; and FIG. 3 is an isometric view of the license plate holder of this invention in the open position for the insertion or removal of the license plate.

DESCRIPTION OF THE PREFERRED EMBODIMENT

In the drawings, the letter H designates generally the license plate holder of this invention. The holder H is adapted to be mounted upon a vehicle bumper B, a portion of which illustrated, or any other suitable support. As will be explained more in detail, the holder H includes an inside plate P and a front frame F which are so constructed that they may receive a license plate L whether it is provided with substantially rounded or substantially square corners. In addition, the inside of the plate P and the front frame F are hinged together at sealed corner hinges for the opening and closing of the front frame F with respect to the inside of the plate P. The holder H is adapted to be locked by any conventional padlock 10 from the front side of the front frame F, the details of which will be described hereinafter.

Considering the invention more in detail, the inside of the plate P has a generally rectangular shape and is preferably slightly larger than any license plate L which it is adapted to receive. The inside of the plate P is adapted to be positioned in flush contact with the surface of the vehicle bumper B or other supporting surface, and it is held in such position by a plurality of bolts or screws 12 which extend through openings 14 in the plate P, as well as corresponding openings in the bumper B. If bolts are used rather than screws, each of the bolts has a nut 12a therewith as illustrated in FIG. 2. It will be appreciated that various types of mounting means may be employed rather than the bolts 12 and the nuts 12a, but such mounting means is preferred.

Hinge or pivot tabs 16 are provided at the bottom or lower end of each of the side edges of the plate P. Such tabs 16 may be integral with or connected to the main body of the plate P. Normally, the plate P is made of a metal such as aluminum, but the plate P as well as the tabs 16 may be formed of a plastic and molded in the relationship illustrated in FIG. 3 of the drawings. Each of the hinge tabs 16 has an opening therethrough for receiving a pivot pin 17 which is integral with or connected to the front frame F, as will be more evident hereinafter. Since the pivot pins 17 do not need to extend into the interior of the frame F beyond the hinge tabs 16, they do not interfere with the positioning of the license plate L even if it has substantially square corners. Furthermore, as will be more fully explained, the disposition of the tabs 16 and the pivot pins 17 on each end of the plate P is such that they are completely concealed from visibility when the frame F is in the closed position so that it becomes substantially impossible for a thief or other unauthorized person to disassemble the holder H at the hinge points.

For locking the holder H in the closed position (FIGS. 1 and 2), the inside of the plate P has a locking tab or projection 20 with a suitable opening 20a for receiving a conventional padlock 10 forwardly of the front frame F when the frame F is in the closed position, as will be more fully explained. Tab 20 may be formed integrally with or may be secured to the main body of the plate P, and it likewise may be formed of metal, plastic, or other suitable materials.

The front frame has two substantially equal length front frame sections 22 and 24, each of which preferably has a pair of covers 22a and 24a, respectively, which serve to cover the holes in a license plate L. It is to be noted that the license plate L or other object held in the holder H is not fastened to the holder H so that it may be readily inserted and removed, as will be more evident. The two substantially equal length front frame sections 22 and 24 are joined with shorter front frame sections 26 and 28 which are substantially equal to each other to form a substantially rectangular window opening which is defined by the inner edges of the frame sections 22, 24, 26, and 28 so that the license plate L within the holder H is thereby visible when the holder H is in closed position.

Each of the four front frame sections 22, 24, 26, and 28 extends substantially parallel to the inside plate P when the front frame F is in the closed position, and each has side frame sections 22B, 24B, 26B, and 28B, respectively, which extend substantially perpendicular to the front frame section. Thus, the front frame F completely surrounds the plate P when the front frame F is in the closed position (FIG. 2), and yet, because of the concealed hinges provided by the hinge tabs 16 and the pivot or hinge pins 17, the front frame S may move to a substantially perpendicular position as shown in FIG. 3 without contacting the bumper B.

The hinge or pivot pins 17 are formed integrally or are secured to the bottom or lower portions of the side frame sections 26B and 28B. Since the pivot pins 17 are not visible to a person from the outside of the frame S, the danger of an unauthorized person breaking the license plate apart at the hinges is substantially decreased. First, the unauthorized person must attempt to locate the hinges, which is extremely difficult since they are not visible when the frame F is in the closed position. Furthermore, the opening of the front frame F is substantially more difficult when the hinge pins themselves are unavailable to an unauthorized person since it then becomes necessary to attempt to open the holder by damaging the frame or distorting it. The time involved in such procedure is greater than when a hinge is readily visible and available, and therefore the construction of this invention discourages unauthorized entry when the holder is in the closed position.

In the preferred form of the invention, the window opening defined by the front frame sections 22, 24, 26, and 28 is closed by a substantially rectangular sheet 40 which is formed of plastic or glass, or any other transparent material. The dimensions of the transparent sheet 40 are such that the edges extend beyond the edges of the window formed by the front frame sections so as to be confined by the side frame sections 22b, 24b, 26b, and 28b. When the transparent window sheet 40 is utilized, it is preferable to employ corner cushions 42 in each of the corners to hold the sheet 40 in a nonrattling position between such cushions 42 and the heads of the screws or bolts 12. Such cushions 42 may be formed of rubber or any other resilient material, the thickness of which will depend upon the dimensions of the transparent sheet 40 and the space provided within the front frame F.

The front frame F has a locking slot 22c formed in its front frame section 22 (FIG. 2) and through which the locking tab 20 extends when the front frame F is in the closed position. Thus, a single locking tab 20 is capable of holding the conventional padlock 10 for locking the entire holder H in the closed position.

When the padlock is removed, the front frame F may be pivoted to the open position of FIG. 3 for the insertion or removal of the license plate L or other object, and thereafter the front frame F may be again closed and locked in the closed position of FIGS. 1 and 2. The license plate L is held in position securely by the holder H when it is in the closed position without using any fastening screws or other means for securing the license plate L to the holder H, as explained.

The foregoing disclosure and description of the invention are illustrative and explanatory thereof, and various changes in the size, shape, and materials as well as in the details of the illustrated construction may be made without departing in the scope of the appended claims without departing from the spirit of the invention.

I claim:
1. A holder for holding a license plate or the like, comprising:
 (a) an inside plate;
 (b) said inside plate having openings therethrough for receiving mounting means;
 (c) a front frame having two substantially equal length front frame sections and two shorter front frame sections generally defining a rectangular window opening and extending substantially parallel to said inside plate when said front frame is in the closed position;
 (d) each of said four front frame sections having side frame sections of substantially the same length as its respective front frame section and integral therewith and disposed substantially perpendicular thereto;
 (e) a hinge tab on the lower end of each side edge of said inside plate;
 (f) each of the hinge tabs having a pivot opening therein;
 (g) a pivot pin extending inwardly from the lower end of each of the two shorter side frame sections;
 (h) each of the pivot pins extending into the pivot opening of the adjacent hinge tab for thereby concealing the hinge tabs and pivot pins internally of said front frame;
 (i) a locking tab secured to the upper edge of said inside plate and extending outwardly therefrom substantially perpendicular to said inside plate;
 (j) the upper one of said two substantially equal length front frame sections having a slot therethrough which is aligned with said locking tab when the front frame section is in the closed position;
 (k) said locking tab having an eye which projects outwardly of said front frame section when in the closed position for receiving a conventional padlock to securely lock a license plate or the like between the front frame and the inside plate.

2. The structure set forth in claim 1, including:
 (a) a sheet of transparent material having a generally rectangular shape which is larger than said rectangular window opening but is smaller than the area defined by said side frame sections for thereby confining said sheet by said front frame in front of the license plate.

3. The structure set forth in claim 1, including:
 (a) a sheet of transparent material having a generally rectangular shape which is larger than said rectangular window opening but is smaller than the area defined by said side frame sections for thereby confining said sheet by said front frame in front of the license plate; and
 (b) resilient corner cushions disposed on the inside of said front frame at each corner thereof for resiliently engaging said sheet to prevent it from rattling.

References Cited
UNITED STATES PATENTS

| | | | |
|---|---|---|---|
| 2,134,594 | 10/1938 | Andelenis | 40—202 |
| 2,710,475 | 6/1955 | Salzmann | 40—202 |

JEROME SCHNALL, *Primary Examiner.*

WENCESLAO J. CONTRERAS, *Assistant Examiner.*

U.S. Cl. X.R.

40—10